US011772312B2

(12) United States Patent
Horiuchi

(10) Patent No.: US 11,772,312 B2
(45) Date of Patent: Oct. 3, 2023

(54) STATE DETERMINATION DEVICE AND STATE DETERMINATION METHOD FOR DETERMINING OPERATION STATE OF INJECTION MOLDING MACHINE

(71) Applicant: FANUC Corporation, Yamanashi (JP)

(72) Inventor: Atsushi Horiuchi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 894 days.

(21) Appl. No.: 16/561,018

(22) Filed: Sep. 5, 2019

(65) Prior Publication Data
US 2020/0101651 A1  Apr. 2, 2020

(30) Foreign Application Priority Data

Sep. 28, 2018  (JP) .................................. 2018-185855

(51) Int. Cl.
*B29C 45/76* (2006.01)
*G05B 19/406* (2006.01)

(52) U.S. Cl.
CPC .......... *B29C 45/768* (2013.01); *G05B 19/406* (2013.01); *B29C 2945/76163* (2013.01); *B29C 2945/76494* (2013.01); *G05B 2219/33034* (2013.01); *G05B 2219/34465* (2013.01); *G05B 2219/45244* (2013.01)

(58) Field of Classification Search
CPC .......... B29C 2945/76163; B29C 2945/76494; B29C 2945/76949; B29C 45/768; G05B 13/0265; G05B 19/406; G05B 2219/33034; G05B 2219/34465; G05B 2219/45244; G05B 2219/49065
See application file for complete search history.

(56) References Cited

U.S. PATENT DOCUMENTS

| | | | |
|---|---|---|---|
| 5,153,149 A | 10/1992 | Naito et al. | |
| 2006/0191347 A1* | 8/2006 | Uchiyama | B29C 45/77 73/714 |
| 2007/0106420 A1 | 5/2007 | Wyrwoll | |
| 2009/0053349 A1* | 2/2009 | Imamura | B29C 45/50 425/149 |

(Continued)

FOREIGN PATENT DOCUMENTS

| | | |
|---|---|---|
| CN | 101398672 A | 4/2009 |
| DE | 102004041891 B3 | 4/2006 |

(Continued)

*Primary Examiner* — Kenneth M Lo
*Assistant Examiner* — Tameem D Siddiquee
(74) *Attorney, Agent, or Firm* — HAUPTMAN HAM, LLP

(57) ABSTRACT

A state determination device that determines an operation state of an injection molding machine stores respective specification data of a reference injection molding machine and an injection molding machine that is different from the reference injection molding machine, and acquires data related to the injection molding machine. Then, the state determination device converts the acquired data into yardstick data by a conversion formula set for every type of data, by using the stored specification data of the reference injection molding machine and the stored specification data of the injection molding machine and performs machine learning using the yardstick data obtained through the conversion so as to generate a learning model.

14 Claims, 7 Drawing Sheets

(56) References Cited

U.S. PATENT DOCUMENTS

| | | | |
|---|---|---|---|
| 2014/0370139 A1 | 12/2014 | Horiuchi | |
| 2017/0028593 A1 | 2/2017 | Maruyama | |
| 2017/0220008 A1 | 8/2017 | Takahashi et al. | |
| 2017/0326771 A1 | 11/2017 | Uchiyama | |
| 2018/0348714 A1* | 12/2018 | Larue | A01G 25/16 |
| 2019/0070762 A1 | 3/2019 | Altonen et al. | |
| 2019/0171181 A1* | 6/2019 | Nurani | H01L 22/12 |
| 2020/0089202 A1 | 3/2020 | Horiuchi et al. | |
| 2020/0230857 A1* | 7/2020 | Bonada Bo | B29C 45/76 |

FOREIGN PATENT DOCUMENTS

| | | |
|---|---|---|
| DE | 102019124483 A1 | 5/2020 |
| EP | 3678831 B1 | 11/2021 |
| JP | S6394810 A | 4/1988 |
| JP | H1-168421 A | 7/1989 |
| JP | 201382181 A | 5/2013 |
| JP | 2015482 A | 1/2015 |
| JP | 2017-30221 A | 2/2017 |
| JP | 2017-134786 A | 8/2017 |
| JP | 2017154497 A | 9/2017 |
| JP | 2017-202632 A | 11/2017 |

* cited by examiner

FIG.3

| TYPE OF MACHINE | WEIGHT | MOTOR MAXIMUM TORQUE [N·m] | REDUCTION RATIO | MAXIMUM INJECTION PRESSURE [MPa] | SCREW DIAMETER [mm] | ... | REFERENCE |
|---|---|---|---|---|---|---|---|
| A | 30t | 100 | 4.0 | 100 | 20 | ... | |
| B | 50t | 250 | 3.0 | 200 | 24 | ... | |
| C | 150t | 750 | 2.0 | 300 | 32 | ... | |
| D | 300t | 1000 | 1.0 | 400 | 40 | ... | ○ |
| ... | ... | ... | ... | ... | ... | ... | ... |

STATE DETERMINATION DEVICE AND STATE DETERMINATION METHOD FOR DETERMINING OPERATION STATE OF INJECTION MOLDING MACHINE

RELATED APPLICATIONS

The present application claims priority to Japanese Patent Application Number 2018-185855 filed Sep. 28, 2018, the disclosure of which is hereby incorporated by reference herein in its entirety.

BACKGROUND OF THE INVENTION

1. Field of the Invention

The present invention relates to a state determination device and a state determination method and especially relates to a state determination device and a state determination method for assisting maintenance for injection molding machines.

2. Description of the Related Art

Industrial machines such as an injection molding machine are maintained regularly or when an abnormality occurs. In maintenance of an industrial machine, a maintenance staff determines whether an operation state of the industrial machine is normal or abnormal by using physical quantity, which represents operation states of the industrial machine that are preliminarily recorded in operation of the industrial machine, and thus performs maintenance work such as exchange of a part on which an abnormality occurs.

For example, as maintenance work for a check ring of an injection cylinder included in an injection molding machine, a method is known in which a screw is regularly taken out from the injection cylinder to directly measure the dimension of the check ring. However, production has to be temporarily stopped to perform the measurement operation in this method, thus disadvantageously lowering productivity.

As prior art techniques for solving such a problem, techniques are known in which a rotation torque applied on a screw is detected and a back-flow phenomenon in which resin flows toward the back of the screw is detected so as to indirectly detect a wear amount of a check ring of an injection cylinder and diagnose an abnormality without temporarily stopping production such as taking out a screw from the injection cylinder. For example, Japanese Patent Application Laid-Open No. 01-168421 discloses a technique in which a rotation torque acting in a screw rotation direction is measured and abnormality is determined when the rotation torque is not in an allowable range. Further, Japanese Patent Application Laid-Open No. 2017-030221 and Japanese Patent Application Laid-Open No. 2017-202632 disclose techniques for diagnosing abnormality through supervised learning on a load on a driving unit, a resin pressure, and the like. Furthermore, Japanese Patent Application Laid-Open No. 2017-134786 discloses a technique in which pieces of internal information of a plurality of manufacturing machines are acquired and the pieces of internal information acquired from respective manufacturing machines are compared to each other to extract difference and detect an abnormality based on the difference.

However, the technique disclosed in Japanese Patent Application Laid-Open No. 01-168421 has a problem in that an operation for adjusting allowable ranges used for determining abnormality is required for machines having different specifications such as a rated torque and inertia of a motor constituting a driving unit of an injection molding machine and a reduction ratio of reduction gears.

Further, the above-described techniques disclosed in Japanese Patent Application Laid-Open No. 2017-030221 and Japanese Patent Application Laid-Open No. 2017-202632 have a problem in that divergence between measured values obtained from machines having different specifications of components constituting driving units of injection molding machines and numerical values of learning data inputted in machine learning is too large to perform correct diagnosis through machine learning. For example, measured values such as a load on a driving unit and a resin pressure which are obtained in operating a large injection molding machine are large, while measured values such as a load on a driving unit and a resin pressure which are obtained in operating a small injection molding machine are small. Therefore, there is a problem in that even when an abnormality degree is estimated by directly using measured values obtained in operating a small injection molding machine as learning data based on a learning model, which is obtained through machine learning performed by using measured values such as a load on a driving unit and a resin pressure which are obtained in operating a large injection molding machine as learning data, the abnormality degree cannot be correctly estimated due to an influence of difference among different specifications of injection molding machines.

Further, the above-described technique disclosed in Japanese Patent Application Laid-Open No. 2017-134786 has a problem in that a large injection molding machine and a small injection molding machine have difference therebetween in loads on driving units and in measured values of resin pressure, which are obtained by operating machines, and therefore, presence of abnormality cannot be correctly estimated even by comparing measured values used as internal information, for example.

In employing the machine learning technique, various types of learning conditions are prepared as many as combinations of pieces of equipment, such as a motor, reduction gears, and a movable unit, constituting an injection molding machine and machine learning is performed when learning models of the machine learning are produced, and thus learning models are associated with machines having various sizes and provided with various types of equipment, allowing diagnosis accuracy to improve. However, preparing corresponding components, such as motors, reduction gears, and movable units, as many as combinations of the pieces of equipment requires a large cost. In addition to this, production materials such as resin and workpieces need to be prepared when machines are operated, requiring large cost for production materials used for acquiring learning data. Further, operations for acquiring learning data require much time. Thus, there is a problem in that learning data cannot be efficiently collected.

SUMMARY OF THE INVENTION

An object of the present invention is to provide a state determination device and a state determination method by which maintenance of various injection molding machines can be assisted without requiring a large amount of cost.

According to the present invention, even when time-series physical quantity to be inputted in machine learning are acquired from injection molding machines with mutually-different specifications such as a type of a power engine, a state variable, which is derived by numerically converting time-series physical quantity (current and speed, for example) observed based on specification data stored in an injection molding machine into physical quantity on reference scale, is inputted in machine learning as learning data to estimate an abnormality degree. Thus, the above-described problems are solved.

More specifically, estimation of an abnormality degree is implemented by applying learning data, which is obtained through numeric conversion performed so as to absorb difference in types of machines and components, to machine learning even when types of injection molding machines are mutually different, specifically, even when sizes of machines are different as a small size or a large size and even when components of injection molding machines such as injection apparatuses, mold clamping apparatuses, injection cylinders, screws, and power engines are mutually different.

Further, based on an abnormality degree obtained as an output of machine learning, means are provided for stopping or slowing down an operation of a movable unit of a machine so as to secure safety of an operator when an abnormality degree exceeds a predetermined threshold value, for slowing down a power engine that drives the movable unit so as to allow the movable unit to operate safely, for limiting a driving torque of the power engine small, and for displaying a message or an icon expressing a state of an abnormality on a display device.

A state determination device according to an aspect of the present invention determines an operation state of an injection molding machine and includes: a data acquisition unit that acquires data related to the injection molding machine; a specification data storage unit that stores respective specification data of a reference injection molding machine and one or more other injection molding machines different from the reference injection molding machine; a numeric conversion unit that converts data acquired by the data acquisition unit into yardstick data by a conversion formula set for every type of data, using the specification data of the reference injection molding machine and the specification data of the other injection molding machine which are stored in the specification data storage unit; and a learning unit that performs machine learning using the yardstick data obtained through conversion performed by the numeric conversion unit, and generates a learning model.

A state determination device according to another aspect of the present invention determines an operation state of an injection molding machine and includes: a data acquisition unit that acquires data related to the injection molding machine; a specification data storage unit that stores respective specification data of a reference injection molding machine and one or more other injection molding machines different from the reference injection molding machine; a numeric conversion unit that converts data acquired by the data acquisition unit into yardstick data by a conversion formula set for every type of data, using the specification data of the reference injection molding machine and the specification data of the other injection molding machine which are stored in the specification data storage unit; a learning model storage unit that stores a learning model obtained through machine learning performed based on yardstick data related to the reference injection molding machine; and an estimation unit that performs estimation using the learning model stored in the learning model storage unit, based on the yardstick data obtained through conversion performed by the numeric conversion unit.

The learning unit may perform at least one learning among supervised learning, unsupervised learning, and reinforcement learning.

The estimation unit may estimate an abnormality degree related to an operation state of the injection molding machine, and the state determination device may display a warning message on a display device when an abnormality degree estimated by the estimation unit exceeds a predetermined threshold value.

The estimation unit may estimate an abnormality degree related to an operation state of the injection molding machine, and the state determination device may display a warning icon on a display device when an abnormality degree estimated by the estimation unit exceeds a predetermined threshold value.

The estimation unit may estimate an abnormality degree related to an operation state of the injection molding machine, and the state determination device may output at least one of a command for stopping or slowing down an operation and a command for limiting a torque of a power engine to the injection molding machine when an abnormality degree estimated by the estimation unit exceeds a predetermined threshold value.

A state determination method according to still another aspect of the present invention is a method for determining an operation state of an injection molding machine, and includes: a data acquisition step for acquiring data related to the injection molding machine; a numeric conversion step for converting data acquired in the data acquisition step into yardstick data by a conversion formula set for every type of data, using the specification values called from specification data of a reference injection molding machine and one or more other injection molding machines different from the reference injection molding machine; and a learning step for performing machine learning using the yardstick data obtained through conversion in the numeric conversion step and generating a learning model.

A state determination method according to yet another aspect of the present invention is a method for determining an operation state of an injection molding machine, and includes: a data acquisition step for acquiring data related to the injection molding machine; a numeric conversion step for converting data acquired in the data acquisition step into yardstick data by a conversion formula set for every type of data, using the specification values called from specification data of a reference injection molding machine and one or more other injection molding machines different from the reference injection molding machine; and an estimation step for estimating a state of an injection molding machine, based on the yardstick data obtained through conversion in the numeric conversion step, by using a learning model obtained through machine learning performed based on the yardstick data related to the reference injection molding machine.

According to the present invention, data acquired in learning and estimation is numerically converted into yardstick data and learning or estimation processing is performed without collecting learning data of various types of injection molding machines for performing machine learning. Accordingly, various states of injection molding machines can be estimated without requiring large cost in machine learning.

BRIEF DESCRIPTION OF THE DRAWINGS

FIG. 3 illustrates an example of specification data.

DETAILED DESCRIPTION OF THE PREFERRED EMBODIMENTS

Figure 1:
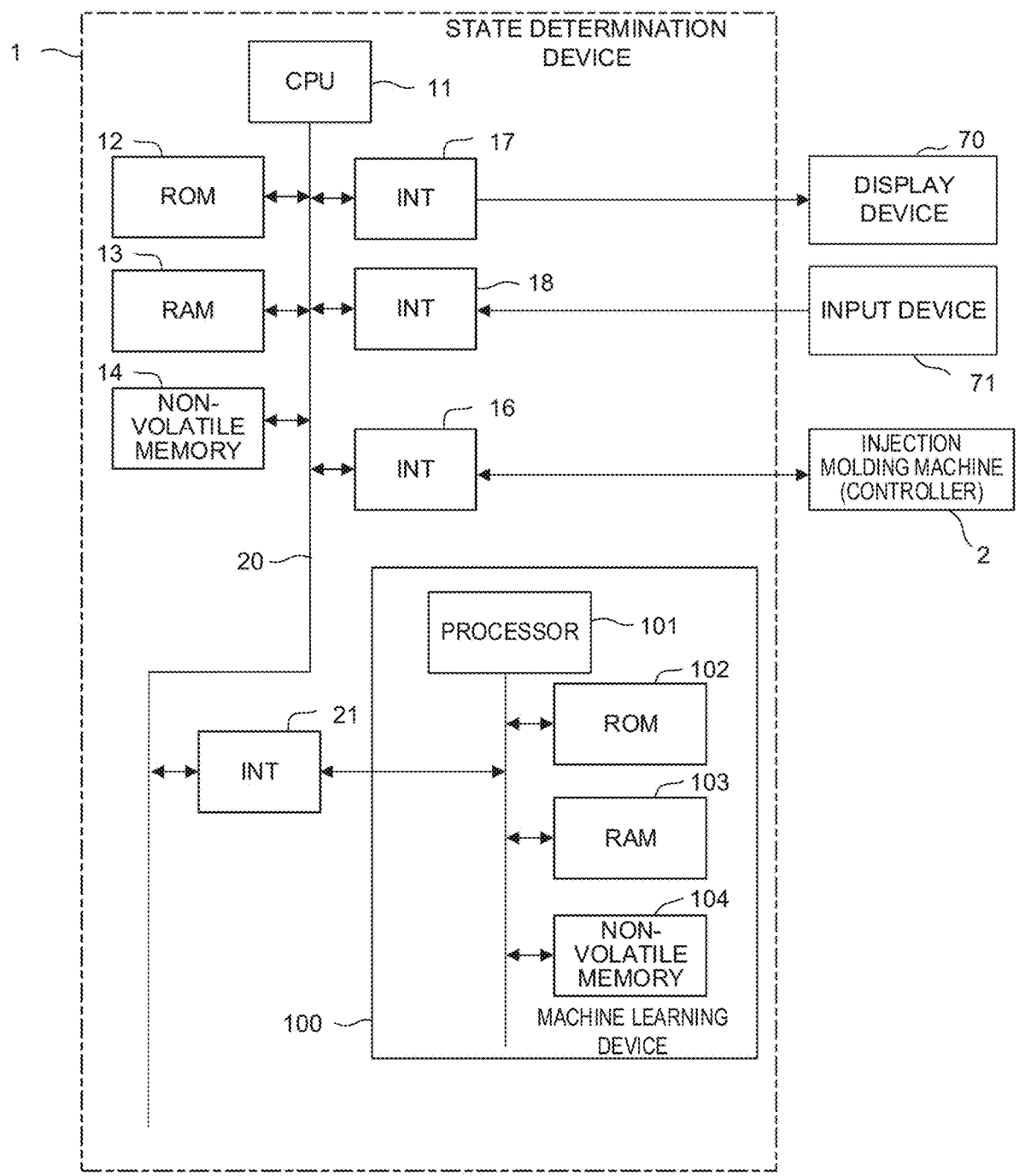
FIG. 1 is a schematic hardware configuration diagram illustrating a state determination device according to an embodiment.

FIG. 1 is a schematic hardware configuration diagram illustrating chief parts of a state determination device including a machine learning device according to an embodiment of the present invention.

A state determination device 1 according to the present embodiment can be mounted on a controller that controls an injection molding machine, for example. Further, the state determination device 1 can be mounted as a personal computer which is installed with a controller that controls an injection molding machine or a computer such as an edge computer, a cell computer, a host computer, and a cloud server which is connected with the controller via a wired/wireless network. The present embodiment provides a description of an example in which the state determination device 1 is mounted as a personal computer which is installed with a controller that controls an injection molding machine.

A CPU 11 included in the state determination device 1 according to the present embodiment is a processor for entirely controlling the state determination device 1. The CPU 11 reads out a system program stored in a ROM 12 via a bus 20 and controls the whole of the state determination device 1 in accordance with the system program. In a RAM 13, transient calculation data, various types of data which are inputted by an operator via an input device 71, and the like are temporarily stored.

A non-volatile memory 14 is composed of a memory, a solid state drive (SSD), or the like which is backed up by a battery (not illustrated), for example, and thus a storage state thereof is maintained even when the state determination device 1 is turned off. The non-volatile memory 14 stores a setting region in which setting information related to an operation of the state determination device 1 is stored, data inputted from the input device 71, various types of data acquired from an injection molding machine 2 (a type of machine, the mass and a material of a die, and a kind of resin, for example), time-series data of various types of physical quantity (a temperature of a nozzle; a position, a speed, an acceleration, a current, a voltage, and a torque of a motor that drives the nozzle; a temperature of a die; and a flow rate, a flow velocity, and pressure of resin, for example) detected in a molding operation by the injection molding machine 2, data read via an external storage device (not illustrated) and a network, and the like. Programs and various types of data stored in the non-volatile memory 14 may be loaded into the RAM 13 when the programs and the data are executed or used. In the ROM 12, a known analysis program for analyzing various types of data, and a system program including, for example, a program for controlling communication with a machine learning device 100 which will be described later are preliminarily written.

The injection molding machine 2 is a machine for manufacturing a product molded with resin such as plastic, and melts resin, which is a material, and fills a die with the melted resin (injects the melted resin into the die) so as to mold the resin. The injection molding machine 2 is composed of various pieces of equipment such as a nozzle, a motor (a power engine), a transmission mechanism, reduction gears, and a movable unit and a state of each of the components is detected by a sensor or the like and an operation of each of the components is controlled by a controller. Examples of the power engine used in the injection molding machine 2 include an electric motor, a hydraulic cylinder, a hydraulic motor, and an air motor. Further, examples of the transmission mechanism used in the injection molding machine 2 include a ball screw, a gear, a pulley, and a belt.

Each piece of data read on a memory, data obtained as results of execution of programs or the like, data outputted from the machine learning device 100 which will be described later, and the like are outputted via an interface 17 to be displayed on a display device 70. Further, the input device 71 composed of a keyboard, a pointing device, or the like transfers a command, data, and the like based on an operation by an operator to the CPU 11 via an interface 18.

An interface 21 is an interface for connecting the state determination device 1 with the machine learning device 100. The machine learning device 100 includes a processor 101 for controlling the whole of the machine learning device 100, a ROM 102 which stores a system program and the like, a RAM 103 for performing temporary storage in each processing related to machine learning, and a non-volatile memory 104 used for storing learning models and the like.

The machine learning device 100 is capable of observing each piece of information (various types of data such as a type of the injection molding machine 2, the mass and a material of a die, and a kind of resin; and time-series data of various types of physical quantity such as a temperature of a nozzle; a position, a speed, an acceleration, a current, a voltage, and a torque of a motor that drives the nozzle; a temperature of a die; and a flow rate, a flow velocity, and pressure of resin, for example) which can be acquired by the state determination device 1, via the interface 21. Further, the state determination device 1 acquires processing results outputted from the machine learning device 100 via the interface 21 and stores and displays the acquired results, and transmits the acquired results to other devices via a network, which is not illustrated, or the like.

Figure 2:
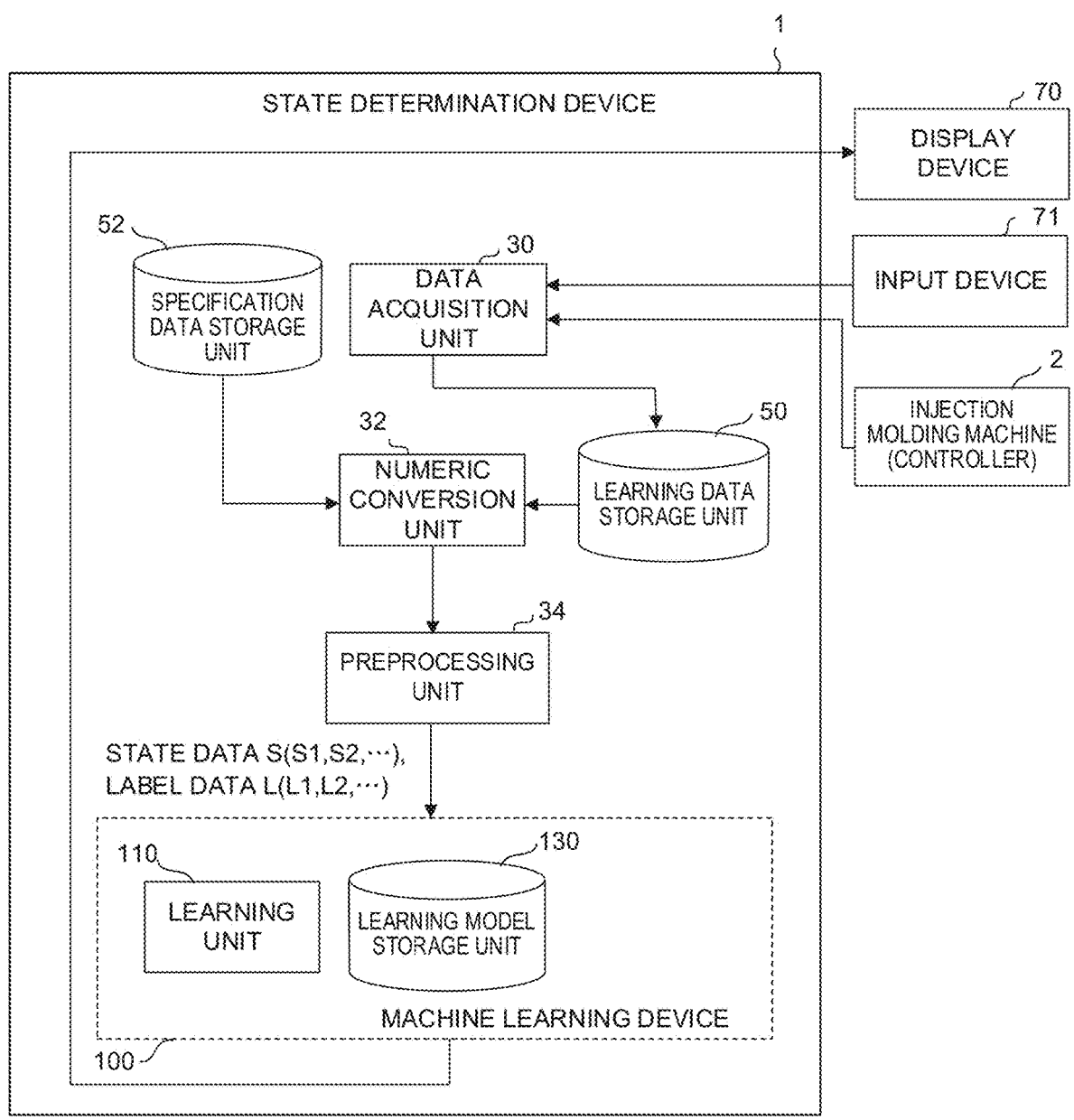
FIG. 2 is a schematic functional block diagram illustrating the state determination device according to a first embodiment.

FIG. 2 is a schematic functional block diagram illustrating the state determination device 1 and the machine learning device 100 according to a first embodiment.

The state determination device 1 according to the present embodiment includes components required for learning performed by the machine learning device 100 (learning mode). Functional blocks illustrated in FIG. 2 are implemented when the CPU 11 included in the state determination device 1 and the processor 101 of the machine learning device 100 which are illustrated in FIG. 1 execute respective system programs and respectively control an operation of each unit of the state determination device 1 and each unit of the machine learning device 100.

The state determination device 1 according to the present embodiment includes a data acquisition unit 30, a numeric conversion unit 32, and a preprocessing unit 34, and the machine learning device 100 included in the state determination device 1 includes a learning unit 110. Further, a learning data storage unit 50 which stores learning data used for machine learning performed by the machine learning device 100 and a specification data storage unit 52 which stores specification data of injection molding machines are provided on the non-volatile memory 14. Furthermore, a learning model storage unit 130 which stores learning models constructed through machine learning performed by the learning unit 110 is provided on the non-volatile memory 104 of the machine learning device 100.

The data acquisition unit 30 acquires various types of data inputted from the injection molding machine 2, the input device 71, and the like. The data acquisition unit 30 acquires various types of data such as a type of the injection molding machine 2, the mass and a material of a die, and a kind of resin; time-series data of various types of physical quantity such as a temperature of a nozzle; a position, a speed, an acceleration, current, a voltage, and a torque of a motor that drives the nozzle; a temperature of a die; and a flow rate, a flow velocity, and pressure of resin; and various types of data such as information related to a maintenance work for the injection molding machine 2 inputted by an operator, for example, and stores these pieces of data in the learning data storage unit 50. The data acquisition unit 30 may acquire data from other devices via an external storage device, which is not illustrated, or the wired/wireless network.

The numeric conversion unit 32 numerically converts data, which is related to the injection molding machine 2 and is included in learning data stored in the learning data storage unit 50, by using specification data stored in the specification data storage unit 52. The numeric conversion unit 32 converts data which is included in learning data and is acquired from the injection molding machine 2 into data having a scale of a reference type of injection molding machine by using a conversion formula, which is preliminarily set for each type of data, and specification data for each type of injection molding machine stored in the specification data storage unit 52.

FIG. 3 illustrates an example of specification data stored in the specification data storage unit 52.

Specification data is data in which various elements of performance of machines are expressed in figures (specification values) and is provided as a specification table from a manufacturer which manufactures machines. The specification data storage unit 52 stores identification information by which a type of an injection molding machine can be identified and specification data of each injection molding machine in a manner to associate the identification information with the specification data, for a reference injection molding machine (type of machine D in the example in FIG. 3) and other injection molding machines. Such specification data may include: a maximum torque, a rated torque, maximum current, rated current, maximum rotation speed, a time constant at rise time, and inertia of a motor; a reduction ratio, a belt width, the number of teeth of a pulley a diameter of a ball screw, and a lead of a ball screw of a speed reducer; and a maximum stroke, maximum speed, maximum thrust, maximum pressure, inertia, machine efficiency maximum mold clamping force, and a screw diameter of a movable unit of an injection apparatus or a mold clamping apparatus provided to an injection molding machine.

The numeric conversion unit 32 converts time-series data, which is related to the injection molding machine 2 and is included in learning data stored in the learning data storage unit 50, as conversion object data into yardstick data with a conversion formula set for each type of the conversion object data, based on specification data which corresponds to the type of the injection molding machine 2 and is stored in the specification data storage unit 52 and specification data of a reference type of injection molding machine.

Figure 4:
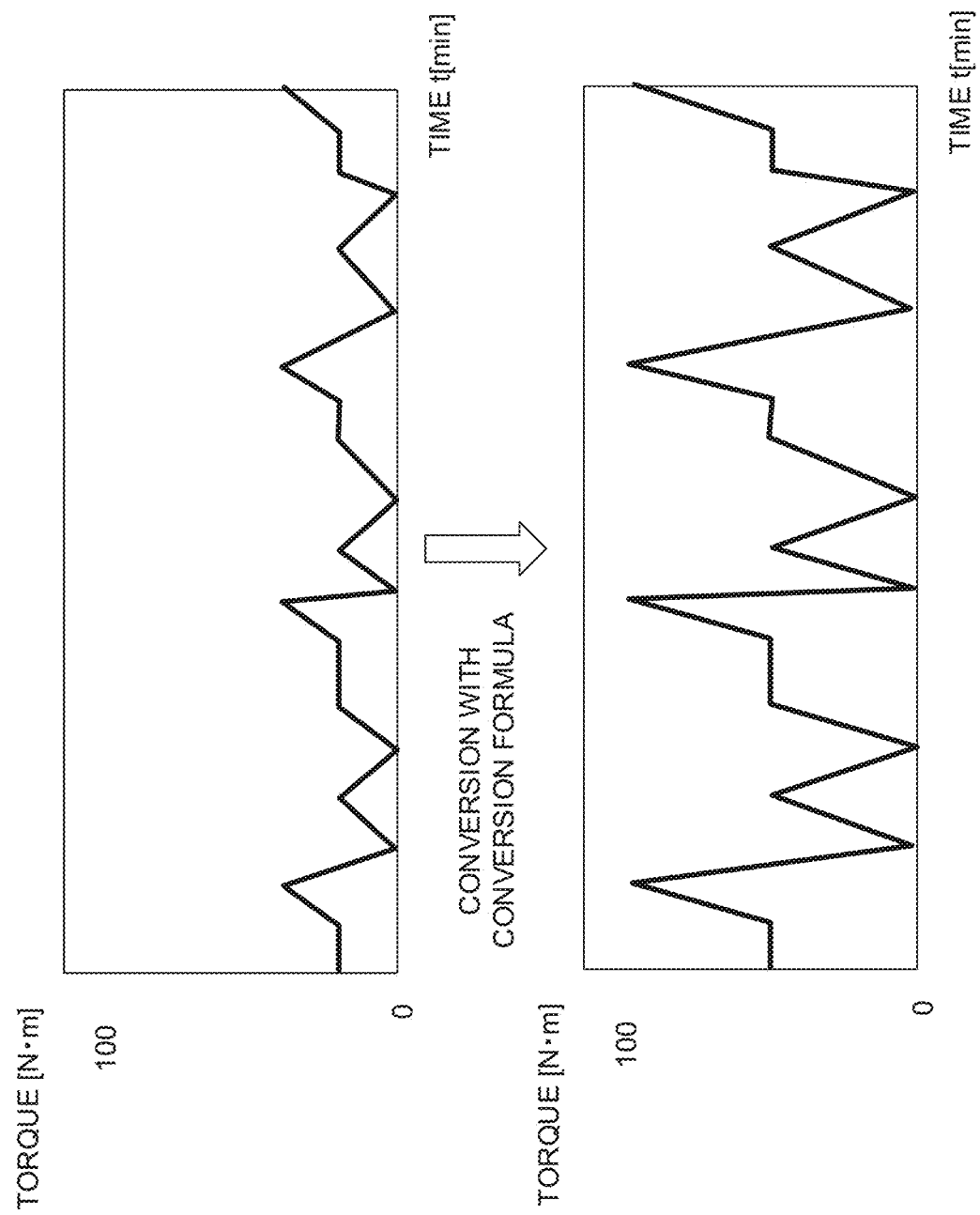
FIG. 4 illustrates an example of numeric conversion of torque values.

A conversion formula for each type of data is preliminarily defined on the non-volatile memory 14 of the state determination device 1. In general, a conversion formula for each type of data can be defined as a formula for multiplying data values taken by a data item physically related to the data or a ratio in a range between the minimum value and the maximum value of possible data values taken by the data item in a reference injection molding machine and an injection molding machine which has acquired the data as the conversion object, based on a relation between the data and the data item physically related to the data. For example, a conversion formula for a torque of a motor driving a movable unit of an injection molding machine can be defined with Formula (1) below using the motor maximum torque $\max T_s$ (the motor minimum torque value is 0) of a reference injection molding machine, the motor maximum torque $\max T_c$ (the motor minimum torque value is 0) of an injection molding machine which has acquired conversion object data, a reduction ratio $Rr_s$ of the reference injection molding machine, and a reduction ratio $Rr_c$ of the injection molding machine which has acquired the conversion object data. In Formula (1), $T_c$ denotes a torque value which is the conversion object data and $T_s$ denotes a yardstick torque after conversion. Graphs in FIG. 4 illustrate torque values before conversion and torque values after conversion (yardstick torque values) obtained in conversion of a torque value which is data acquired from the type of machine A, illustrated in FIG. 3, of injection molding machine with Formula (1) when a reference injection molding machine has the type of machine D of specification data illustrated in FIG. 3.

$$T_s = T_c \times \frac{\max T_s}{\max T_c} \times \frac{Rr_s}{Rr_c} \qquad (1)$$

Figure 5:
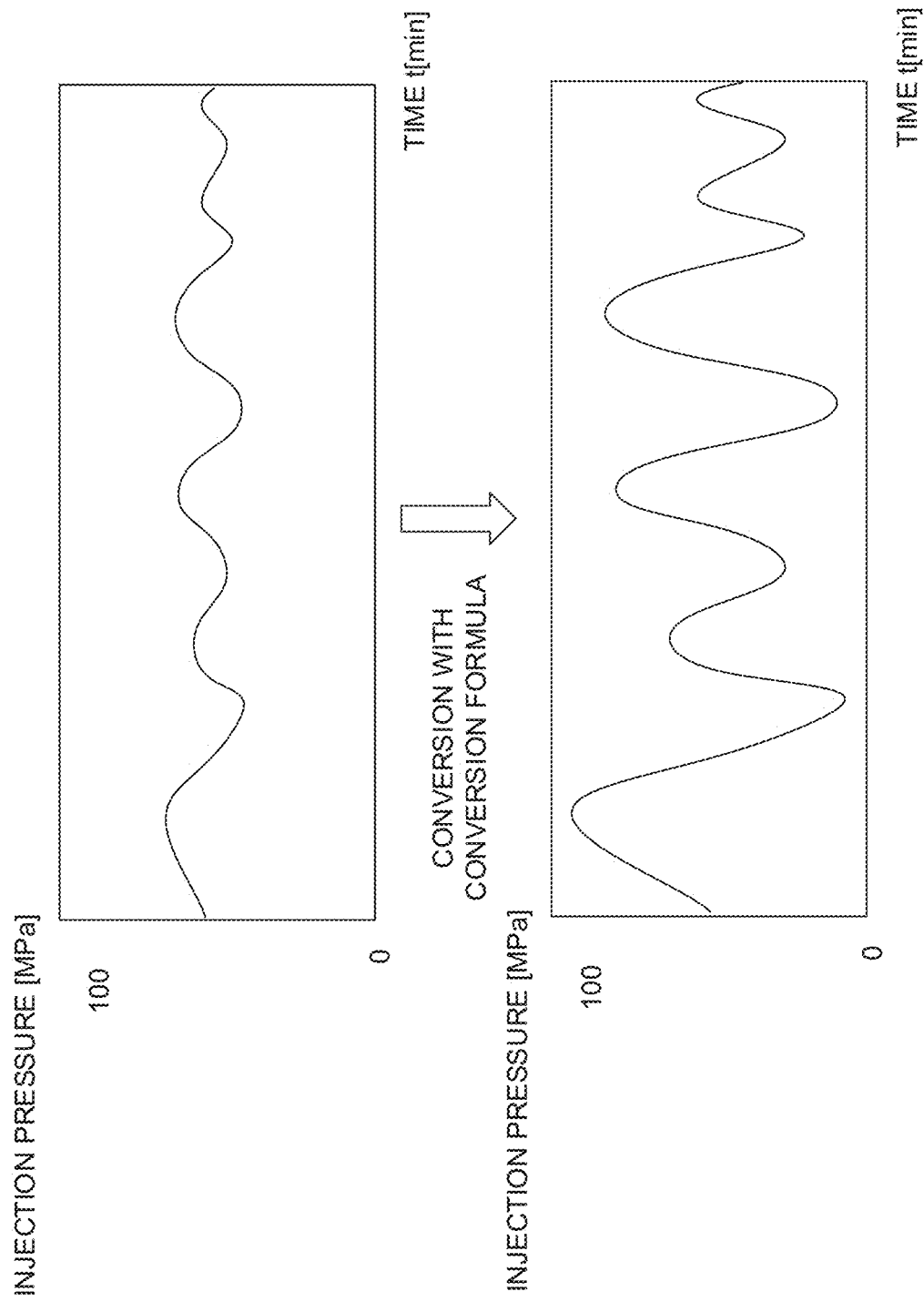
FIG. 5 illustrates an example of numeric conversion of injection pressure.

Further, a conversion formula for injection pressure of an injection molding machine, for example, can be defined with Formula (2) below using the maximum injection pressure $\max Ip_s$ (the minimum injection pressure is 0) of a reference injection molding machine, the maximum injection pressure $\max Ip_c$ (the minimum injection pressure is 0) of an injection molding machine which has acquired conversion object data, a screw diameter $Sd_s$ of the reference injection molding machine, and a screw diameter $Sd_c$ of the injection molding machine which has acquired the conversion object data (a screw diameter is related to injection pressure by the square order). In Formula (2), $Ip_c$ denotes injection pressure which is the conversion object data and $Ip_s$ denotes a yardstick injection pressure after conversion. Graphs in FIG. 5 illustrate injection pressure before conversion and injection pressure after conversion (injection pressure on reference scale) obtained in conversion of injection pressure which is data acquired from the type of machine B, illustrated in FIG. 3, of injection molding machine with Formula (2), in case where a reference injection molding machine has the type of machine D of specification data illustrated in FIG. 3. Conversion formulas for other types of data may be defined in a similar manner to the above description while considering the configuration of injection molding machines.

$$Ip_s = Ip_c \times \frac{\max Ip_s}{\max Ip_c} \times \frac{Sd_s^2}{Sd_c^2}$$

The preprocessing unit 34 creates state data to be used for learning performed by the machine learning device 100, based on yardstick data obtained through conversion performed by the numeric conversion unit 32. The preprocessing unit 34 creates state data obtained by converting (quantifying, normalizing, sampling, for example) data acquired from the numeric conversion unit 32 into data having a unified format to be used in the machine learning device 100. For example, when the machine learning device 100 performs unsupervised learning, the preprocessing unit 34 creates state data S having a predetermined format in the unsupervised learning; when the machine learning device 100 performs supervised learning, the preprocessing unit 34 creates a set of state data S and label data L having a predetermined format in the supervised learning; and when the machine learning device 100 performs reinforcement learning, the preprocessing unit 34 creates a set of state data S and determination data D having a predetermined format in the reinforcement learning.

The learning unit 110 performs machine learning using state data which is created by the preprocessing unit 34 based on yardstick data obtained through conversion performed by the numeric conversion unit 32. The learning unit 110 generates learning models by performing machine learning using data acquired from the injection molding machine 2, with a known machine learning method such as unsupervised learning, supervised learning, and reinforcement learning, and stores the generated learning models in the learning model storage unit 130. Examples of the unsupervised learning performed by the learning unit 110 include the autoencoder method and the k-means method. Examples of the supervised learning include the multilayer perceptron method, the recurrent neural network method, the long short-term memory method, and the convolutional neural network method. Examples of the reinforcement learning include the Q learning.

The learning unit 110 performs unsupervised learning based on state data which is obtained by converting learning data, which is acquired from the injection molding machine 2 which is in a normal operation state, by the numeric conversion unit 32 and the preprocessing unit 34 and thus, the learning unit 110 is capable of generating distribution of learning data acquired in a normal state (and converted into yardstick data) as a learning model, for example. With the learning model thus generated, an estimation unit 120 which will be described later is capable of estimating how much learning data acquired from the injection molding machine 2 deviates from learning data acquired in a normal operation state and thus calculating an abnormality degree as an estimation result.

Further, the learning unit 110 performs supervised learning using data which is obtained by imparting a normal label to data acquired from the injection molding machine 2 which is in a normal operation state and imparting an abnormal label to data acquired from the injection molding machine 2 before and after an abnormality has occurred, enabling to generate a discrimination boundary between normal data and abnormal data as a learning model, for example.

With the learning model thus generated, the estimation unit 120 which will be described later is capable of estimating whether the learning data acquired from the injection molding machine 2 belongs to normal data or abnormal data and thus calculating a label value (normal/abnormal) as an estimation result and reliability of the label value.

In the state determination device 1 having the above-described configuration, learning data acquired from the injection molding machine 2 is converted into data on scale of a reference injection molding machine and the learning unit 110 performs learning by using the data obtained through the conversion. Thus, data used for learning by the learning unit 110 is based on yardstick data obtained through conversion by the numeric conversion unit 32, so that a learning model created by the learning unit 110 is used for estimation for a data value varying in a range of data which can be taken by a reference injection molding machine.

Figure 6:
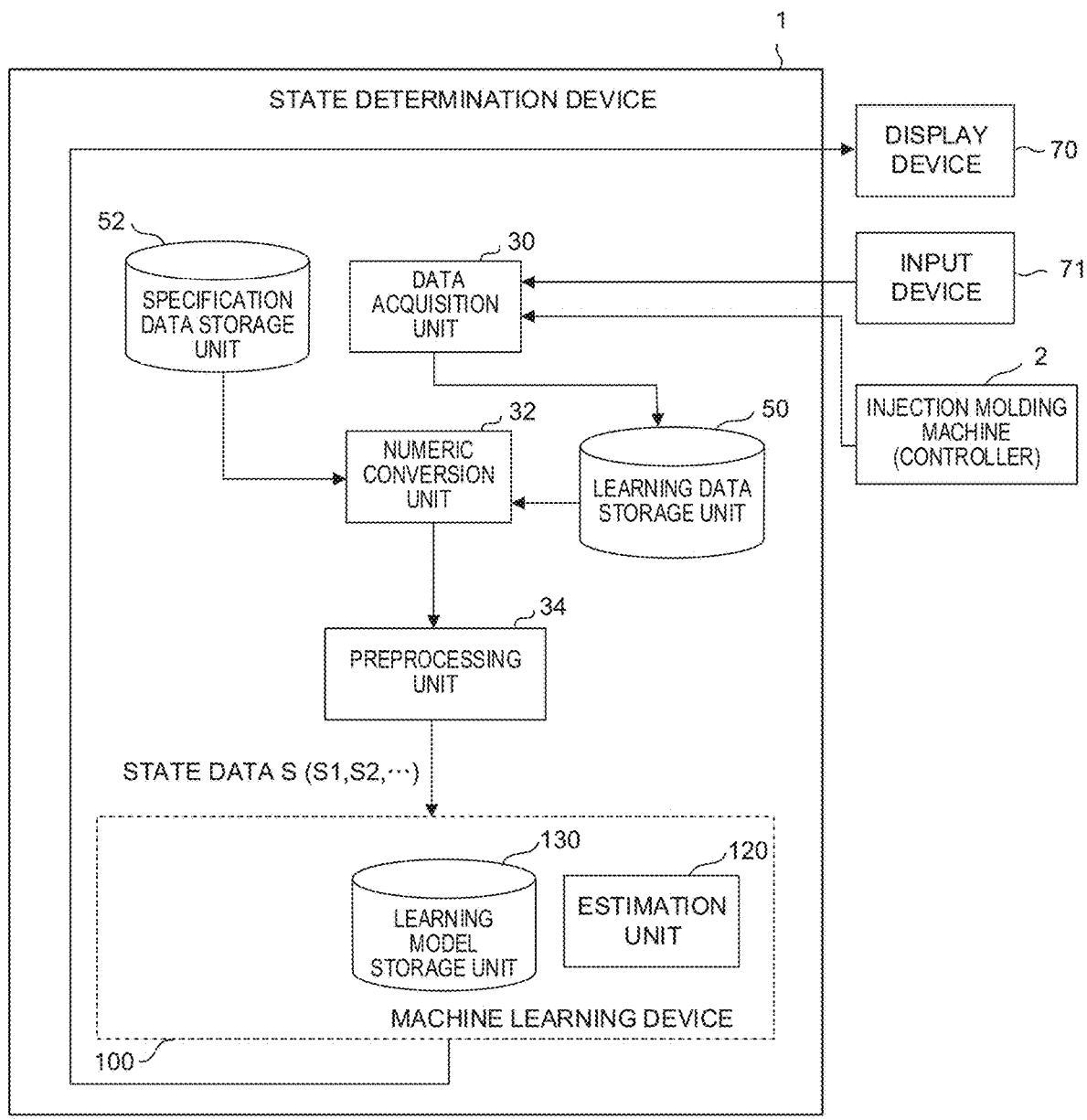
FIG. 6 is a schematic functional block diagram illustrating a state determination device according to a second embodiment during estimation.

FIG. 6 is a schematic functional block diagram illustrating the state determination device 1 and the machine learning device 100 according to a second embodiment.

The state determination device 1 according to the present embodiment has the configuration required for estimation performed by the machine learning device 100 (estimation mode). Functional blocks illustrated in FIG. 6 are implemented when the CPU 11 included in the state determination device 1 and the processor 101 of the machine learning device 100 which are illustrated in FIG. 1 execute respective system programs and respectively control an operation of each unit of the state determination device 1 and each unit of the machine learning device 100.

The state determination device 1 according to the present embodiment includes the data acquisition unit 30, the numeric conversion unit 32, the preprocessing unit 34, and the machine learning device 100, as is the case with the first embodiment. The machine learning device 100 included in the state determination device 1 includes the estimation unit 120. Further, the learning data storage unit 50 which stores learning data used for state estimation performed by the machine learning device 100 and the specification data storage unit 52 which stores specification data of injection molding machines are provided on the non-volatile memory 14, and the learning model storage unit 130 which stores learning models constructed through machine learning performed by the learning unit 110 is provided on the non-volatile memory 104 of the machine learning device 100.

The data acquisition unit 30 and the numeric conversion unit 32 according to the present embodiment respectively have similar functions of the data acquisition unit 30 and the numeric conversion unit 32 according to the first embodiment.

The preprocessing unit 34 according to the present embodiment creates data to be used for estimation performed by the machine learning device 100, based on data which is obtained by converting, by the numeric conversion unit 32, the learning data stored in the learning data storage unit 50 into yardstick data. The preprocessing unit 34 creates state data obtained by converting (quantifying, normalizing, sampling, for example) acquired data into data having a uniformed format to be used in the machine learning device 100. The preprocessing unit 34 creates state data S having a predetermined format in estimation performed by the machine learning device 100.

The estimation unit 120 estimates a state of an injection molding machine by using a learning model stored in the learning model storage unit 130 based on the state data S created based on unlabeled data by the preprocessing unit 34. In the estimation unit 120, the state data S inputted from the preprocessing unit 34 is inputted into the learning model created (of which parameters are determined) by the learning unit 110 so as to estimate and calculate an abnormality degree related to a state of the injection molding machine and estimate and calculate a class (normal/abnormal, for example) to which an operation state of the injection molding machine belongs. Results obtained through estimation by the estimation unit 120 (an abnormality degree related to a state of an injection molding machine and a class to which an operation state of the injection molding machine belongs, for example) may be displayed and outputted to the display device 70 and may be transmitted and outputted to a host computer, a cloud computer, and the like (not illustrated), via a wired/wireless network so as to be used.

Figure 7:
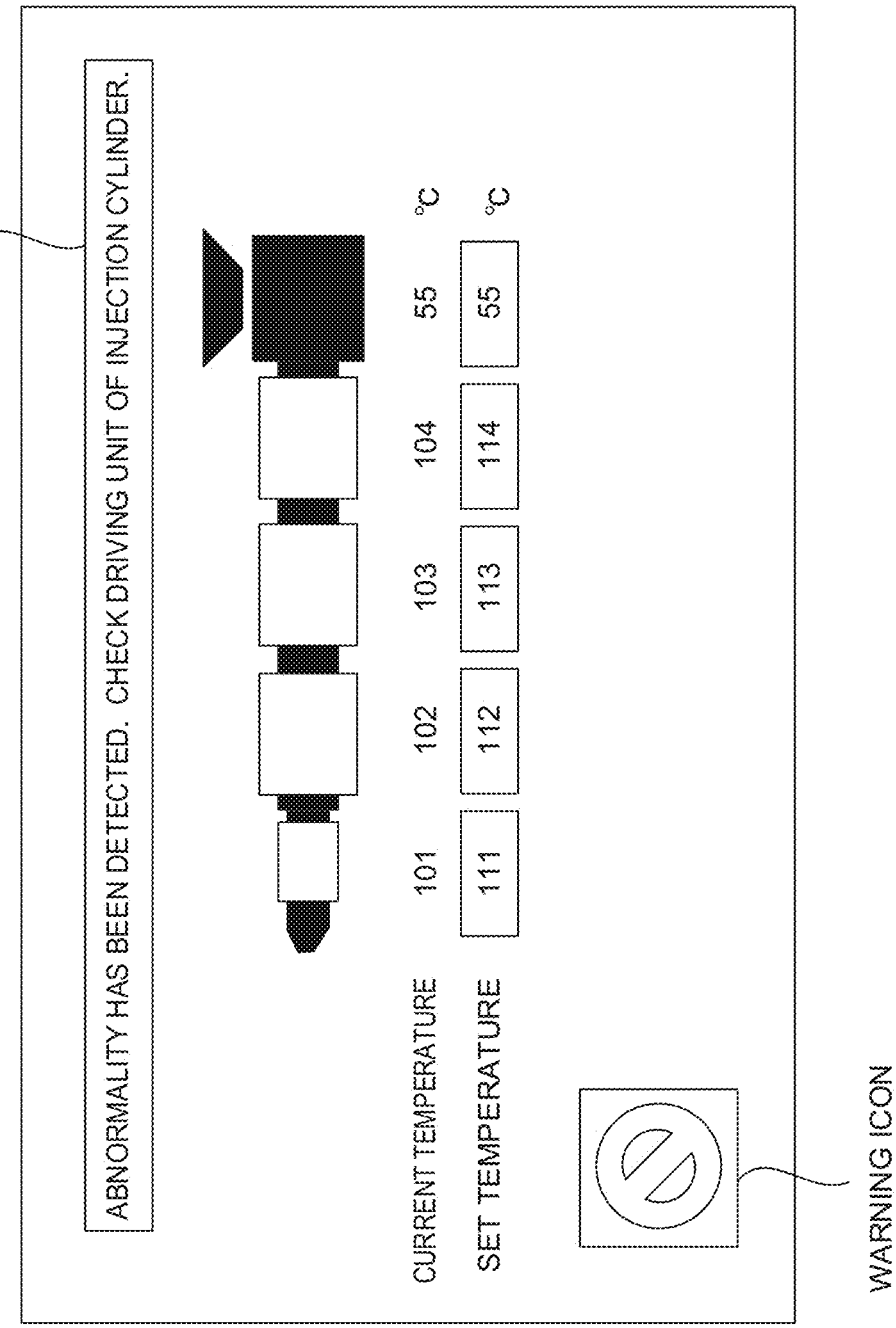
FIG. 7 illustrates a display example for an abnormal state.

Further, when a result estimated by the estimation unit 120 is in a predetermined state (when an abnormality degree estimated by the estimation unit 120 exceeds a predetermined threshold value or when a class to which an operation state of an injection molding machine belongs and which is estimated by the estimation unit 120 is "abnormal", for example), the state determination device 1 may perform display output on the display device 70 with a warning message or an icon as illustrated in FIG. 7, for example, or may output a command for stopping or slowing down an operation, a command for limiting a torque of a motor, or the like, to the injection molding machine.

In the state determination device 1 having the above-described configuration, learning data acquired from the injection molding machine 2 is converted into data on scale of a reference injection molding machine and the estimation unit 120 performs estimation of a state of the injection molding machine 2 by using the data obtained through the conversion. A learning model stored in the learning model storage unit 130 is used for estimation for a data value that varies in a range of data which can be taken by a reference injection molding machine. However, even learning data acquired from injection molding machines in different types from the reference injection molding machine is converted into yardstick data by the numeric conversion unit 32 before the estimation unit 120 performs estimation. Accordingly, estimation processing can be appropriately performed.

The embodiments according to the present invention have been described thus far. However, the present invention is not limited to the examples of the above-described embodiments and may be embodied in various aspects by appropriately adding alterations.

For example, the above embodiments provide the description in which the state determination device 1 and the machine learning device 100 are devices having mutually different CPUs (processors), but the machine learning device 100 may be implemented by the CPU 11 included in the state determination device 1 and the system program stored in the ROM 12.

The invention claimed is:

1. A state determination device for determining an operation state of an injection molding machine, the state determination device comprising:
a data acquisition unit configured to acquire data related to the injection molding machine;
a specification data storage unit storing respective specification data of a reference injection molding machine and one or more other injection molding machines including the injection molding machine different from the reference injection molding machine;
a numeric conversion unit configured to convert the data acquired by the data acquisition unit into yardstick data by a conversion formula set for data types related to the injection molding machine, using the specification data of the reference injection molding machine and the specification data of the injection molding machine which are stored in the specification data storage unit;
a learning unit configured to
perform machine learning using the yardstick data obtained through conversion performed by the numeric conversion unit, and
generate a learning model, wherein the learning unit is configured to perform the machine learning among at least one of supervised learning, unsupervised learning, or reinforcement learning; and
an estimation unit configured to estimate an abnormality degree related to the operation state of the injection molding machine using the learning model, wherein
the state determination device, in response to the abnormality degree exceeding a predetermined threshold value, outputs to the injection molding machine at least one command for at least one of stopping an operation of the injection molding machine, slowing down the operation of the injection molding machine, or limiting a torque of a motor of the injection molding machine, wherein the injection molding machine is caused to stop or slow down the operation, or limit the torque of the motor based on the at least one command,
the conversion formula includes a first conversion formula for the torque of the motor of the injection molding machine defined by $$T_s = T_c \times \frac{\max T_s}{\max T_c} \times \frac{Rr_s}{Rr_c},$$

where $\max T_s$ denotes a first motor maximum torque of the reference injection molding machine,
$\max T_c$ denotes a second motor maximum torque of the injection molding machine,
$Rr_s$ denotes a first reduction ratio of the reference injection molding machine,
$Rr_c$ denotes a second reduction ratio of the injection molding machine,
$T_c$ denotes a first torque value of the data, and
$T_s$ denotes a second torque value of the yardstick data.

2. A state determination device for determining an operation state of an injection molding machine, the state determination device comprising:
a data acquisition unit configured to acquire data related to the injection molding machine;
a specification data storage unit storing respective specification data of a reference injection molding machine and one or more other injection molding machines including the injection molding machine different from the reference injection molding machine;
a numeric conversion unit configured to convert the data acquired by the data acquisition unit into yardstick data by a conversion formula set for of data types related to the injection molding machine, using the specification data of the reference injection molding machine and the specification data of the injection molding machine which are stored in the specification data storage unit;
a learning model storage unit storing a learning model obtained through machine learning performed based on yardstick data related to the reference injection molding machine, wherein the learning model is obtained by the machine learning among at least one of supervised learning, unsupervised learning, or reinforcement learning; and
an estimation unit configured to estimate an abnormality degree related to the operation state of the injection molding machine using the learning model stored in the learning model storage unit, based on the yardstick data obtained through conversion performed by the numeric conversion unit, wherein the state determination device, in response to the abnormality degree exceeding a predetermined threshold value, outputs to the injection molding machine at least one command for at least one of stopping an operation of the injection molding machine, slowing down the operation of the injection molding machine, or limiting a torque of a motor of the injection molding machine, wherein the injection molding machine is caused to stop or slow down the operation, or limit the torque of the motor based on the at least one command, the conversion formula includes a first conversion formula for the torque of the motor of the injection molding machine defined by $$T_s = T_c \times \frac{\max T_s}{\max T_c} \times \frac{Rr_s}{Rr_c}$$

where $\max T_s$ denotes a first motor maximum torque of the reference injection molding machine,
$\max T_c$ denotes a second motor maximum torque of the injection molding machine,
$Rr_s$ denotes a first reduction ratio of the reference injection molding machine,
$Rr_c$ denotes a second reduction ratio of the injection molding machine,
$T_c$ denotes a first torque value of the data, and
$T_s$ denotes a second torque value of the yardstick data.

3. The state determination device according to claim 2, wherein
the state determination device is configured to, in response to the abnormality degree exceeding the predetermined threshold value, cause a display device to display a warning message.

4. The state determination device according to claim 2, wherein
the state determination device is configured to, in response to the abnormality degree exceeding the predetermined threshold value, cause a display device to display a warning icon.

5. A state determination method of determining an operation state of an injection molding machine, the state determination method comprising:
acquiring data related to the injection molding machine;
converting the data into yardstick data by a conversion formula set for data types related to the injection molding machine, using specification values called from specification data of a reference injection molding machine and one or more other injection molding machines including the rejection molding machine different from the reference injection molding machine;
performing machine learning using the yardstick data obtained through conversion, wherein the machine learning includes supervised learning, unsupervised learning, and reinforcement learning;
generating a learning model; and
estimating an abnormality degree related to the operation state of the injection molding machine using the learning model; and
in response to the abnormality degree exceeding a predetermined threshold value, outputting to the injection molding machine at least one command for at least one of stopping an operation of the injection molding machine, slowing down the operation of the injection molding machine, or limiting a torque of a motor of the injection molding machine, wherein the injection molding machine is caused to stop or slow down the operation, or limit the torque of the motor based on the at least one command, wherein
the conversion formula includes a first conversion formula for the torque of the motor of the injection molding machine defined by $$T_s = T_c \times \frac{\max T_s}{\max T_c} \times \frac{Rr_s}{Rr_c}$$

where $\max T_s$ denotes a first motor maximum torque of the reference injection molding machine,
$\max T_c$ denotes a second motor maximum torque of the injection molding machine,
$Rr_s$ denotes a first reduction ratio of the reference injection molding machine,
$Rr_c$ denotes a second reduction ratio of the injection molding machine,
$T_c$ denotes a first torque value of the data, and
$T_s$ denotes a second torque value of the yardstick data.

6. A state determination method of determining an operation state of an injection molding machine, the state determination method comprising:
acquiring data related to the injection molding machine;
converting the data into yardstick data by a conversion formula set for data types related to the injection molding machine, using specification values called from specification data of a reference injection molding machine and one or more other injection molding machines including the injection molding machine different from the reference injection molding machine;
estimating an abnormality degree related to the operation state of the injection molding machine, based on the yardstick data obtained through conversion, by using a learning model obtained through machine learning performed based on yardstick data related to the reference injection molding machine, wherein the learning model is obtained by the machine learning among at least one of supervised learning, unsupervised learning, or reinforcement learning; and
in response to the abnormality degree exceeding a predetermined threshold value, outputting to the injection molding machine at least one command for at least one of stopping an operation of the injection molding machine, slowing down the operation of the injection molding machine, or limiting a torque of a motor of the injection molding machine, wherein the injection molding machine is caused to stop or slow down the operation, or limit the torque of the motor based on the at least one command, wherein
the conversion formula includes a first conversion formula for the torque of the motor of the injection molding machine defined by $$T_s = T_c \times \frac{\max T_s}{\max T_c} \times \frac{Rr_s}{Rr_c}$$

where $\max T_s$ denotes a first motor maximum torque of the reference injection molding machine,
$\max T_c$ denotes a second motor maximum torque of the injection molding machine,
$Rr_s$ denotes a first reduction ratio of the reference injection molding machine, $Rr_c$ denotes a second reduction ratio of the injection molding machine, $T_c$ denotes a first torque value of the data, and $T_s$ denotes a second torque value of the yardstick data.

7. The state determination device according to claim 1, wherein
the yardstick data stored in the specification data storage unit include at least a position pertaining to the operation of the injection molding machine, a speed pertaining to the operation of the injection molding machine, an acceleration pertaining to the operation of the injection molding machine, a current pertaining to the operation of the injection molding machine, a voltage pertaining to the operation of the injection molding machine, a torque pertaining to the operation of the injection molding machine, a flow velocity pertaining to the operation of the injection molding machine, or a flow rate pertaining to the operation of the injection molding machine.

8. The state determination device according to claim 1, wherein
the specification data stored in the specification data storage unit include at least a maximum current of the injection molding machine, a rated current of the injection molding machine, a time constant at rise time of the injection molding machine, an inertia of the motor of the injection molding machine, a reduction ratio of the injection molding machine, a belt width of the injection molding machine, a number of teeth of a pulley of the injection molding machine, a diameter of a ball screw of the injection molding machine, a lead of a ball screw of a speed reducer of the injection molding machine, a maximum stroke of the injection molding machine, a maximum thrust of the injection molding machine, a maximum pressure of the injection molding machine, a further inertia of the injection molding machine, a machine efficiency of the injection molding machine, or a maximum mold clamping force of a mold clamping apparatus of a machine to drive the injection molding machine.

9. The state determination device according to claim 2, wherein
the yardstick data stored in the specification data storage unit include at least a position pertaining to the operation of the injection molding machine, a speed pertaining to the operation of the injection molding machine, an acceleration pertaining to the operation of the injection molding machine, a current pertaining to the operation of the injection molding machine, a voltage pertaining to the operation of the injection molding machine, a torque pertaining to the operation of the injection molding machine, a flow velocity pertaining to the operation of the injection molding machine, or a flow rate pertaining to the operation of the injection molding machine.

10. The state determination device according to claim 2, wherein
the specification data stored in the specification data storage unit include at least a maximum current of the injection molding machine, a rated current of the injection molding machine, a time constant at rise time of the injection molding machine, an inertia of the motor of the injection molding machine, a reduction ratio of the injection molding machine, a belt width of the injection molding machine, a number of teeth of a pulley of the injection molding machine, a diameter of a ball screw of the injection molding machine, a lead of a ball screw of a speed reducer of the injection molding machine, a maximum stroke of the injection molding machine, a maximum thrust of the injection molding machine, a maximum pressure of the injection molding machine, a further inertia of the injection molding machine, a machine efficiency of the injection molding machine, or a maximum mold clamping force of a mold clamping apparatus of a machine to drive the injection molding machine.

11. The state determination method according to claim 5, wherein
the yardstick data stored in the specification data storage unit include at least a position pertaining to the operation of the injection molding machine, a speed pertaining to the operation of the injection molding machine, an acceleration pertaining to the operation of the injection molding machine, a current pertaining to the operation of the injection molding machine, a voltage pertaining to the operation of the injection molding machine, a torque pertaining to the operation of the injection molding machine, a flow velocity pertaining to the operation of the injection molding machine, or a flow rate pertaining to the operation of the injection molding machine.

12. The state determination method according to claim 5, wherein
the specification data stored in the specification data storage unit include at least a maximum current of the injection molding machine, a rated current of the injection molding machine, a time constant at rise time of the injection molding machine, an inertia of the motor of the injection molding machine, a reduction ratio of the injection molding machine, a belt width of the injection molding machine, a number of teeth of a pulley of the injection molding machine, a diameter of a ball screw of the injection molding machine, a lead of a ball screw of a speed reducer of the injection molding machine, a maximum stroke of the injection molding machine, a maximum thrust of the injection molding machine, a maximum pressure of the injection molding machine, a further inertia of the injection molding machine, a machine efficiency of the injection molding machine, or a maximum mold clamping force of a mold clamping apparatus of a machine to drive the injection molding machine.

13. The state determination method according to claim 6, wherein
the yardstick data stored in the specification data storage unit include at least a position pertaining to the operation of the injection molding machine, a speed pertaining to the operation of the injection molding machine, an acceleration pertaining to the operation of the injection molding machine, a current pertaining to the operation of the injection molding machine, a voltage pertaining to the operation of the injection molding machine, a torque pertaining to the operation of the injection molding machine, a flow velocity pertaining to the operation of the injection molding machine, or a flow rate pertaining to the operation of the injection molding machine.

14. The state determination method according to claim 6, wherein
the specification data stored in the specification data storage unit include at least a maximum current of the injection molding machine, a rated current of the injection molding machine, a time constant at rise time of the injection molding machine, an inertia of the motor of the injection molding machine, a reduction ratio of the injection molding machine, a belt width of the injection molding machine, a number of teeth of a pulley of the injection molding machine, a diameter of a ball screw of the injection molding machine, a lead of a ball screw of a speed reducer of the injection molding machine, a maximum stroke of the injection molding machine, a maximum thrust of the injection molding machine, a maximum pressure of the injection molding machine, a further inertia of the injection molding machine, a machine efficiency of the injection molding machine, or a maximum mold clamping force of a mold clamping apparatus of a machine to drive the injection molding machine.

\* \* \* \* \*